Patented May 29, 1934

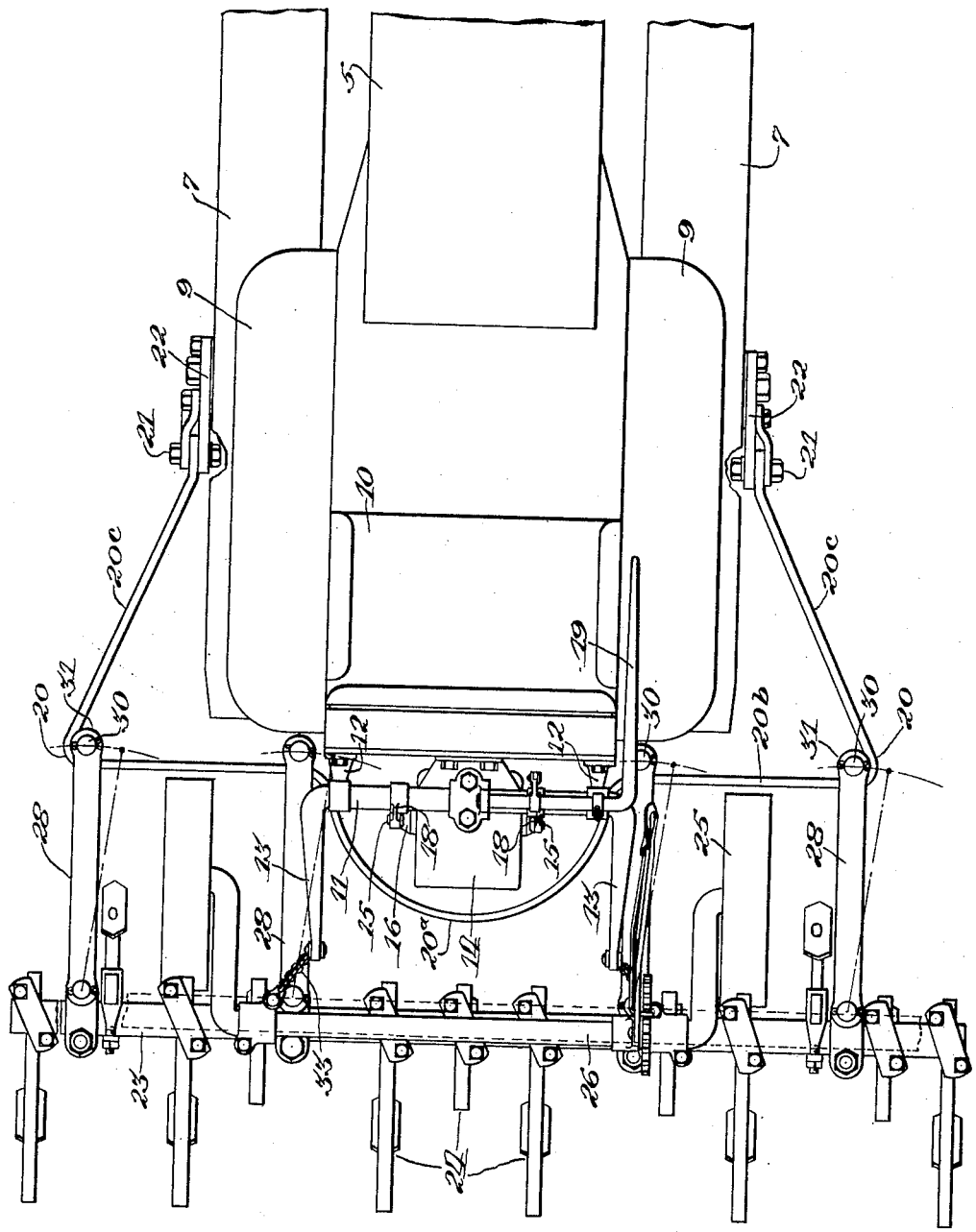

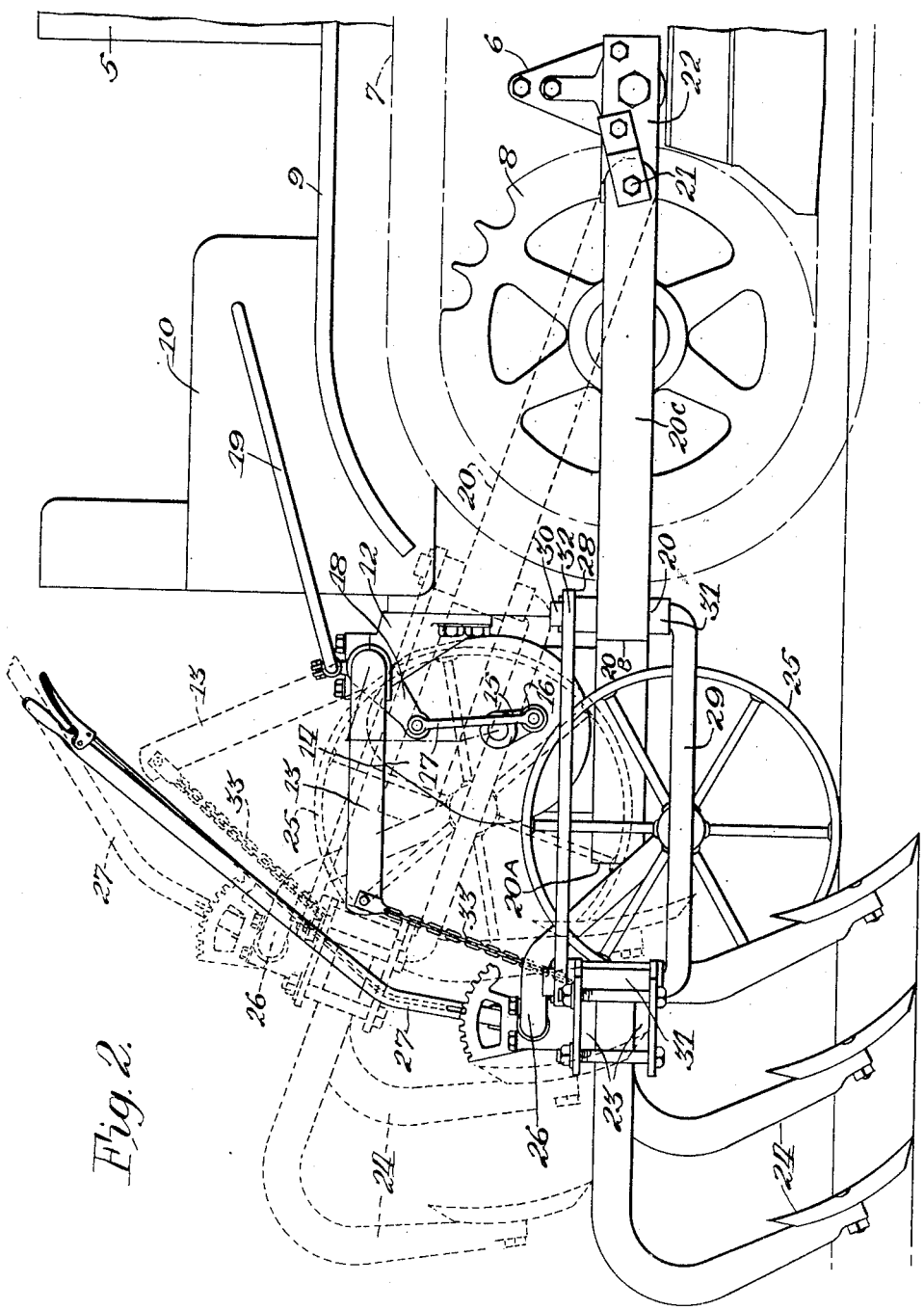

1,960,269

UNITED STATES PATENT OFFICE 1,960,269

IMPLEMENT ATTACHMENT FOR TRACTORS

Alexus C. Lindgren, Chicago, Ill., assignor to International Harvester Company, a corporation of New Jersey Application July 5, 1932, Serial No. 620,803

8 Claims. (Cl. 97—47)

This invention relates to earth working attachments for tractors generally, but more particularly to an improved manner of connecting earth working implements to crawler type tractors.

Tractors of the track-laying, or crawler, type running on endless track belts at each side of the tractor body are subject to considerable weaving or abrupt angular movements horizontally during travel, and that has heretofore made it difficult to satisfactorily guide and operate ground working tools closely connected to one end of the tractor, as these, when fixedly mounted as has been the practice, will be thrown or shifted laterally by the weaving travel of the tractor, often causing breakage or inefficient work.

The main object of the present invention is to provide a close coupled earth working implement attachment having a connecting frame construction embodying means for permitting lateral movements of the tractor independently of the tool carrying elements of the frame and also permitting free floating movement of the frame and tools vertically as a unit.

Other purposes of the invention and advantages of the construction in which it is embodied will become apparent from the following detailed description in connection with the accompanying drawings, where:

Figure 1 is a plan view of an implement attachment embodying the invention shown in position on the rear end of a crawler type tractor; and, Figure 2 is a side elevation of the structure seen in Figure 1, with the raised position of the attachment shown in broken lines.

In the present instance the invention is disclosed in connection with a crawler type tractor, the rear portion of which is shown on the drawings. Such a tractor comprises a body 5, composed of the power plant and transmission mechanism, supported on track frames 6 at each side. The track frames are equipped with the usual sprocket wheels at the front and rear, over which the endless treads 7 run, one of the rear or drive sprockets being shown at 8. Fenders 9 overhang the rear portions of the treads, and the operator's station or seat 10 is mounted between them on the rear end of the tractor body. As means for lifting and lowering an implement hitched to the rear end of the tractor there is provided a transverse rockshaft 11 journaled in suitable bearing brackets 12 on the rear of the tractor and formed with one or more rearwardly extending lifting arms, as at 13. The rockshaft 11 is preferably actuated by a motor driven, half revolution, intermittent clutch device contained in a housing 14 centrally mounted on the tractor. The clutch device imparts a half revolution at each actuation to a crank shaft 15 which has crank arms 16 on its ends, which project from each side of the housing 14. The cranks 16 are connected by links 17 with crank arms 18 fixed on the rockshaft 11. Actuation of the clutch mechanism is controlled by a trip lever 19 adjacent the operator's station and so connected to the clutch device that slight rocking movement serves to connect the clutch to impart a half revolution to the shaft 15, after which the clutch automatically disconnects. This causes alternate up and down movements of the lifting arms 13 within the range indicated on Figure 2. The particular power lift arrangement just described is more particularly described and claimed in assignee's copending application Serial No. 644,982, filed November 30, 1932, and is specifically not part of the present invention except as lifting means broadly enters into the general organization disclosed here.

In the practice of the present invention, there is provided a tractor attachment having a bail shaped draw-bar 20 formed with a transverse, or bight, portion located as near the rear end of the tractor as possible, bowed rearwardly at 20ª to clear the housing 14 and having aligned straight end portions 20ᵇ shown as extending beyond the track frames. The draft arms 20ᶜ of the drawbar extend forwardly and inwardly on the outer sides of the track frames, so that the bail shaped drawbar, in effect, incloses the rear end of the tractor, and the draft arms are pivotally connected at 21 to brackets 22 bolted to the respective track frames. The drawbar is thus free to swing vertically, but cannot swing laterally. This drawbar carries a rearwardly spaced implement which is connected to the drawbar in such a manner as to allow relative horizontal, or lateral, movement between the implement and darwbar while maintaining them in substantial parallelism and holding them fixed as to relative movement between them vertically. As here shown, the implement consists of a transverse tool carrying member 23 which may be as long or longer than the tractor is wide, and to which there may be clamped any desired earth working tools such as gangs of cultivator shovels 24. The implement beam may be supported on suitable depth guaging means, such as ground wheels 25, shown as carried by a cranked axle 26 journaled on the member 23 and adjustable by means of a hand lever 27 equipped with the usual latch mechanism for holding the axle at desired adjustment to vary the working depth of the tools. The tool carrying member 23 is connected to the drawbar by means of a plurality of horizontally spaced parallel link members 28, preferably disposed in pairs at each side of the central longitudinal line of the tractor with the members of each pair on opposite sides of the respective gauge wheels 25 and with the outer links connected on the ends of the arms 20c at their junction with the bight portion of the drawbar.

The link members are preferably formed of a main rod or bar 29 (Figure 2) formed with upright end portions 30 journaled in elongated bearings 31 on the implement carrying member and the drawbar, and a strut or brace bar 32 connecting the upright ends 30 of the main bar 29. This construction of the link members permits lateral swaying movements of the tractor within the range expected in practical operation without also causing the tool carrying member to shift laterally. The displacement that may occur in practice, without materially affecting the tool member, is indicated in broken lines on Figure 1.

In order to permit free floating movement of the implement attachment about the pivots 21 of the drawbar, the tool member 23 is preferably connected to the lifting arms 13 by flexible elements or chains 33.

With the structure described, the lateral weaving movements of the tractor during forward travel will be almost entirely taken up in the lateral swinging movement of the parallel link members 28, and the tool carrying portion of the attachment will, therefore, continue to move in a straight forward path with the tools forming straight furrows. Upon wide turning movement of the tractor the tools will trail properly and not be swept laterally through the soil. When the implement attachment is to be raised for transport or when making short turns of the tractor, the entire attachment will swing upward as a unit about the axis of pivotal connection of the draft arms 20c at 21 to the track frames, as the elongated, vertical bearings of the links 28 afford a vertically rigid form of connection between the drawbar and the tool carrying member.

The preferred embodiment of the invention herein disclosed is subject to variations as to details of construction without departure from the scope of the invention as defined in the following claims.

What is claimed is:

1. The combination with a track layer tractor of a bail-shaped drawbar inclosing the rear end of the tractor and having its arms pivoted on a horizontal axis to the sides thereof for free vertical movement, and an earth working implement connected to the drawbar for free movement laterally.

2. The combination with a tractor of a bail-shaped drawbar having its transverse portion extending across the rear end of the tractor and its arms pivotally connected thereto for free movement vertically, an earth working implement including a transverse member spaced rearwardly of the drawbar, and draft members rigidly connecting the transverse member and the drawbar with respect to relative movement vertically and pivoted to both for free movement laterally.

3. The combination with a track layer tractor of a bail-shaped drawbar inclosing the rear end of the tractor and having its arms pivoted on a horizontal axis to the sides thereof for free vertical movement, the bight portion of the drawbar being located close to the rear end of the tractor, an earth working implement back of the drawbar, and connecting members between the drawbar and implement having upright pivot ends journaled in bearings on the implement and the drawbar and freely movable horizontally.

4. The combination with a track layer tractor of a bail-shaped drawbar inclosing the rear end of the tractor and having its arms pivoted on a horizontal axis to the sides thereof for free vertical movement, the bight portion of the drawbar being located close to the rear end of the tractor, an earth working implement comprising a tool carrying member extending transversely across the path of the tractor in rearwardly spaced relation to the drawbar, horizontally spaced parallel connecting members between the drawbar and the tool carrying member having upright pivot ends journaled in bearings on the drawbar and the tool carrying member, and lift mechanism on the tractor comprising a rockshaft having a rearwardly extending lifting arm, means for rocking the shaft, and a flexible connection between the end of the lifting arm and the tool carrying member.

5. An implement attachment for the rear end of crawler type tractors comprising a transverse draft bar having end portions extending forwardly and positioned for connection to the outer sides of the crawler frames of the tractor, an earth working implement located back of the transverse draft bar, and horizontally spaced parallel connecting members pivoted to the draft bar and the implement for movement about vertical axes.

6. An implement attachment for the rear end of crawler type tractors comprising a transverse draft bar extending beyond the crawler frames of the tractor and having forwardly and inwardly extending end portions adapted for pivotal connection to the outer sides of the crawler frames, an earth working implement comprising a cross-member spaced rearwardly of the draft bar, and horizontally spaced parallel connecting members having vertical ends journaled in bearings on the draft bar and cross-member.

7. An implement attachment for crawler type tractors having a track frame at each side, comprising an implement carrying member extending across the path of the tractor and draft connections between said member and the tractor comprising rigid links located at each side of the longitudinal median line of the tractor, means connecting said links to the outer sides of the track frames for swinging movement about a horizontal axis, and vertically disposed elongated bearings on said means and on the implement carrying member in which the ends of the respective links are journaled for movement horizontally.

8. An implement attachment for crawler type tractors having lateral track frames, comprising the combination of an implement carrying member extending beyond the treads of the track frames, ground wheels on said member, rearwardly extending draft arms pivoted on the outer sides of the track frames on a horizontal transverse axis located between the ends of said track frames, rigid links between said implement carrying member and the draft arms vertically pivoted at each end to allow for lateral swaying movements of the tractor, and lifting means on the tractor connected to the implement carrying member by a flexible element.

ALEXUS C. LINDGREN.